United States Patent Office 3,647,922
Patented Mar. 7, 1972

3,647,922
MIXTURES OF POLYOLEFINS OF HIGH IMPACT STRENGTH HAVING AN IMPROVED TRANSPARENCY
Hans-Joachim Leugering, Frankfurt am Main, and Helmut Schaum, Bad Soden, Taunus, Germany, assignors to Farbwerke Hoechst Aktiengesellschaft, Frankfurt am Main, Germany
No Drawing. Filed June 13, 1969, Ser. No. 833,196
Int. Cl. C08f 29/12
U.S. Cl. 260—876 B
4 Claims

ABSTRACT OF THE DISCLOSURE

The present invention relates to thermoplastic moulding compositions, consisting of two components in a determined mixing ratio, one component being polyethylene having a melt index $i_2$ (at 190° C.) within the range of from 0.4 to 80 and the other component being a sequenced copolymer of propylene and ethylene having a melt index $i_{10}$ (at 190° C.) within the range of from 0.5 to 60. Furthermore, the present invention provides a process for the manufacture of these moulding compositions.

The mixtures in accordance with the invention can be processed to shaped articles which are distinguished by an improved impact strength at low temperatures and an improve transparency, while having substantially the same hardness.

The present invention relates to mixtures of polyolefins of high impact strength having an improved transparency and a process for their manufacture.

It has been proposed to improve the impact strength at low temperatures of polypropylene by the so-called sequenced copolymerization, which is sometimes called segment copolymerization, (see R. L. Tusch, Polym. Eng. a. Sci. 6 (1966), No. 3, pages 255 to 259). As compared with the homopolymers, these sequenced copolymers have the disadvantage that they have a reduced transparency.

It has also been proposed, for example in British Pat. 934,640, to improve the impact strength of isotactic homopolymer polypropylene by the addition of polyethylene. Comparison tests have shown, however, that the impact strength at low temperatures of mixtures of isotactic polypropylene and polyethylene can only be improved to the detriment of transparency. (See comparison examples in Table 2 below).

According to French Pat. 1,453,601, 1 to 50 parts of a polyethylene having a density of 0.93 to 0.96 and a melt index of 0 ($i_2$ at 190° C.) are mixed at 175° to 225° C. with 50 to 99 parts of a statistical or sequenced copolymer of 0.2 to 40% by weight of ethylene and residual amounts of propylene for preparing a mixture of polypropylene and polyethylene of high impact strength at low temperatures.

It is pointed out in the said patent that this is mainly a homogeneous mixture. It has been found, however, that the processing of the mixtures prepared according to this process is difficult when using a product having a melt index of about 0 (determined according to ASTM–D 1238–62 T, paragraph E) and leads to inhomogeneous mixtures, as can be seen in the phase contrast microscope.

The admixture of polyethylene to sequenced copolymers of propylene and ethylene according to French Patent 1,453,601 leads to a poorer transparency at the same time the impact strength is not improved even at low temperatures (see comparison examples in Table 3 below).

It is known that injection-moulded shaped articles of polyethylene are non transparent as compared with those of polypropylene, as it is also shown in the examples below. It would, therefore, be expected that the transparency as well as the hardness of the known mixtures of isotactic polypropylene and polyethylene would also be reduced with increasing concentrations of polyethylene.

Now we have found that mixtures of (a) 70 to 99.5, preferably 75 to 98% by weight of a sequenced copolymer of propylene and ethylene from 1 to 30, preferably 3 to 20% by weight of ethylene and residual amounts of propylene having a melt index $i_{10}$ at 190° C. of 0.5 to 60, preferably 1 to 30, and
(b) 0.5 to 30, preferably 2 to 25% by weight of polyethylene of a melt index of $i_2$ at 190° C. of 0.4 to 80, preferably 1 to 30, have an improved impact strength at low temperatures, substantially the same hardness and an improved transparency, the latter being surprising.

Depending on the properties chosen of the two starting components an optimum impact strength at low temperatures and an optimum transparency are obtained, optionally at a determined concentration. This is especially surprising because the two starting components are non-transparent polymers.

The two starting components are obtained by known processes, for example the low-pressure polymerization using Ziegler catalysts.

The sequenced copolymers of propylene and ethylene to be admixed may be obtained, for example, according to Belgian Pat. 655,564, by alternatively introducing propylene and ethylene into the polymerization vessel, and carrying out the sequenced copolymerization in the presence of a catalyst, one component of which being the reduction product of titanium tetrachloride with an alkyl-aluminum chloride, for example ethylaluminum sesquichloride and the other component (activator) being an organo-aluminum compound.

The reduction of $TiCl_4$ is carried out at temperatures within the range of from $-20$ to $+20°$ C., the molar ratio of Al to Ti is advantageously within the range of from 0.55 to 1.5. Before being mixed with the activator, the Ti-component is advantageously heated in an inert hydrocarbon to temperatures within the range of from 60 to 100° C. and subsequently washed. The heat treatment and washing of the Ti-catalyst may be carried out repeatedly, in which case the temperature may be raised but should not exceed 140° C.

The polymerization temperature is advantageously within the range of from 10 to 90° C., the molecular weight of the sequenced copolymer may be regulated with the help of hydrogen.

The polyethylenes used in accordance with the invention may be obtained, for example, according to Belgian Pat. 533,362 by polymerizing ethylene in inert diluents with catalysts which consist of mixtures of trialkyl aluminum compounds and compounds of the metals of sub-group 4 to 6 of the Mendeléeff Periodic Table, especially titanium compounds.

The preparation of the polyethylenes used in accordance with the invention may also be carried out with the help of so-called isolated catalysts, by separating the transition metal compound reduced by means of an organometallic compound, advantageously an organo-aluminum compound from the reaction mixture before mixing with the activator, and optionally washing it with inert hydrocarbons (see French Pat. 1,148,791).

The mixing of the sequenced copolymers of propylene and ethylene with polyethylene may be carried out on any desired mixer, for example rollers, kneaders or extruders. The mixing temperatures are advantageously above the softening point of the polyolefins used and may be within the range of from 150° to 300° C., preferably 180° to 250° C.

The polymer mixtures in accordance with the invention can be processed in the thermoplastic range to yield shaped articles which are distinguished by a high impact strength at low temperatures, a high transparency and a good hardness.

The following is a short description of the methods used for determining some values important for the process in accordance with the invention.

(a) DETERMINATION OF THE IMPACT STRENGTH

For examining the impact strength a falling hammer is dropped through a tube on a clamped plate. The drop height at which the plate only just withstands without breaking, is determined. The drop test is carried out at different temperatures, for example −10° C. and −30° C., on injection-moulded plates of 60 x 60 x 2 millimeters.

(b) DETERMINATION OF THE VISCOSITY

The $\eta_{spec/c}$-value is measured at 135° C. in a 0.1% solution in decahydronaphthalene (unit: dl./g.) and the melt index $i_2/i_5$ or $i_{10}$ at 190° C. according to DIN 53 735 (unit: g./10 minutes).

(c) BALL INDENTATION HARDNESS

The ball indentation hardness is determined after 10 seconds on plates 6 millimeters thick with a 20 kp. weight and a ball of a diameter of 5 millimeters (unit: kp./cm.$^2$).

(d) DETERMINATION OF THE TRANSPARENCY

For examining the transparency, the light transmission of an injection moulded plate 2 millimeters thick is measured with a photometer with a sharply bundled light ray.

(See A. C. Webber; Journal of the Optical Society of America 47, 785 (1957): Method for the Measurement of Transparency of Sheet Material.)

As only relative comparisons are needed a conversion into absolute units was dispensed with; the deflection of the measuring instrument, proportional to the amount of light transmitted is indicated in mV as a measure.

EXAMPLES

In a double screw extruder amounts of 1 kilogram of mixtures of the sequenced copolymer A of propylene and ethylene and polyethylenes B to G were homogenized at 220° C. with different weight ratios. From this material, the test specimens for the impact strength (injection moulded plates 60 x 60 x 2 millimeters), for the ball indentation hardness and the transparency were prepared. The values $\eta_{spec/c}$ and the values $i_{10}$ indicated in the tables were measured on the injection moulded material.

The starting materials A to G used had the following physical properties:

TABLE 1

|  | $\eta_{spec/c}$ | $i_2$ (190°) | $i_5$ (190°) | $i_{10}$ (190°) |
|---|---|---|---|---|
| Sequenced copolymer of propylene and ethylene A | 4.4 | | | 1.9 |
| Polyethylene: | | | | |
| B | [1] 20 | | 0.01 | |
| C | 2.6 | 0.7 | 2.3 | |
| D | 1.4 | 6.9 | 21.7 | |
| E | 1.2 | 16.2 | [2] | |
| F | 1.0 | 26.0 | [2] | |
| Polypropylene, homopolymer G | 4.4 | | | 3.0 |

[1] Measured at 135° C. in a 0.03% solution in decahydronaphthalene.
[2] Not measurable.

The following series of tests were carried out, the results obtained are indicated in the following tables.

TABLE 2.—COMPARISON TESTS: MIXTURES OF HOMOPOLYMER ISOTACTIC POLYPROPYLENE G WITH POLYETHYLENE E

| Comparison test No. | Product G contains (percent E)— | $\eta_{spec/c}$ | $i_{10}$(190° C.) | Drop test (cm.) 0° C. | Drop test (cm.) −30° C. | Ball indentation hardness | Transparency (mV) |
|---|---|---|---|---|---|---|---|
| 2a | 0 | 2.8 | 4.6 | 25 | <20 | 621 | 3.0 |
| 2b | 1 | 3.0 | 4.6 | 25 | <20 | 650 | 4.5 |
| 2c | 3 | 2.9 | 5.1 | 25 | <20 | 637 | 5.4 |
| 2d | 5 | 2.9 | 5.9 | 25 | <20 | 627 | 6.4 |
| 2e | 7 | 2.9 | 6.7 | 25 | <20 | 637 | 5.9 |
| 2f | 10 | 3.0 | 6.8 | 25 | <20 | 637 | 5.4 |
| 2g | 20 | 2.8 | 7.3 | 140 | 25 | 618 | 3.2 |
| 2h | 30 | 2.6 | 10.5 | 150 | 25 | 618 | 0.9 |
| 2i | 50 | 2.3 | 16.9 | 205 | 140 | 606 | 0.5 |
| 2k | 70 | 2.0 | 23.8 | 245 | 170 | 606 | 0.5 |
| 2l | 90 | 1.6 | 35.3 | 400 | 325 | 564 | 0.5 |

TABLE 3.—MIXTURES OF SEQUENCED COPOLYMER A OF PROPYLENE AND ETHYLENE WITH POLYETHYLENE B

| Comparison test No. | Product A contains (percent B)— | $\eta_{spec/c}$ | $i_{10}$(190° C.) | Drop test (cm.) 0° C. | Drop test (cm.) −30° C. | Ball indentation hardness | Transparency (mV) |
|---|---|---|---|---|---|---|---|
| 3a | 1 | 3.2 | 3.8 | 300 | 90 | 509 | 1.5 |
| 3b | 3 | 3.2 | 3.5 | 275 | 85 | 503 | 1.0 |
| 3c | 5 | 3.1 | 3.5 | 300 | 90 | 503 | 0.8 |
| 3d | 7 | 3.3 | 3.2 | 280 | 75 | 484 | 0.9 |
| 3e | 10 | 3.5 | 3.0 | 270 | 90 | 497 | 0.7 |
| 3f | 15 | 3.4 | 2.7 | 200 | 90 | 482 | 0.8 |
| 3g | 20 | 3.0 | 2.5 | 175 | 75 | 481 | 0.6 |
| 3h | 25 | 3.2 | 2.2 | 200 | 75 | 465 | 0.7 |
| 3i | 30 | 3.7 | 1.5 | 175 | 80 | 472 | 0.6 |

TABLE 4.—MIXTURES OF SEQUENCED COPOLYMER A OF PROPYLENE AND ETHYLENE WITH POLYETHYLENE C

| Comparison test No. | Product A contains (percent C)— | $\eta_{spec/c}$ | $i_{10}$(190° C.) | Drop test (cm.) 0° C. | Drop test (cm.) −30° C. | Ball indentation hardness | Transparency (mV) |
|---|---|---|---|---|---|---|---|
| 1a | 1 | 3.3 | 4.6 | 425 | 190 | 518 | 5.3 |
| 1b | 3 | 3.1 | 4.7 | >450 | 225 | 563 | 5.0 |
| 1c | 5 | 3.2 | 4.3 | >450 | 230 | 518 | 7.7 |
| 1d | 7 | 3.1 | 4.4 | >450 | 240 | 497 | 5.2 |
| 1e | 10 | 3.0 | 4.2 | >450 | 250 | 503 | 3.5 |
| 1f | 15 | 3.0 | 3.7 | >450 | 280 | 501 | 2.5 |
| 1g | 20 | 2.9 | 3.2 | >450 | 300 | 509 | 1.1 |
| 1h | 25 | 3.0 | 2.7 | >450 | 330 | 503 | 0.9 |
| 1i | 30 | 2.7 | 3.2 | >450 | >450 | 518 | 0.5 |

TABLE 5.—MIXTURES OF SEQUENCED COPOLYMER A OF PROPYLENE AND ETHYLENE WITH POLYETHYLENE D

| | Product A contains (percent D)— | $\eta_{spec}/c$ | $i_{10}$ (190° C.) | Drop test (cm) 0° C. | Drop test (cm) −30° C. | Ball indentation hardness | Transparency (mV) |
|---|---|---|---|---|---|---|---|
| Example No.: | | | | | | | |
| 2a | (¹) | 4.4 | 1.9 | 400 | 250 | 498 | 0.2 |
| 2b | 1 | 3.3 | 4.8 | 450 | 180 | 499 | 3.3 |
| 2c | 3 | 3.4 | 4.3 | >450 | 225 | 497 | 3.9 |
| 2d | 5 | 3.1 | 4.6 | >450 | 225 | 484 | 5.5 |
| 2e | 7 | 3.2 | 4.8 | >450 | 213 | 481 | 7.7 |
| 2f | 10 | 2.9 | 4.8 | >450 | 210 | 477 | 8.5 |
| 2g | 15 | 2.9 | 4.5 | >450 | 210 | 483 | 9.8 |
| 2h | 20 | 2.9 | 4.6 | >450 | 250 | 484 | 6.9 |
| 2i | 25 | 2.9 | 5.2 | >450 | 250 | 495 | 5.5 |
| 2j | 30 | 2.7 | 6.7 | >450 | 250 | 500 | 1.8 |
| Comparison tests: | | | | | | | |
| a | 50 | 2.4 | 11 | >450 | >450 | 520 | <0.1 |
| b | 70 | 2.0 | 19 | >450 | >450 | 554 | <0.1 |
| c | 90 | 2.1 | 32 | >450 | >450 | 564 | <0.1 |

¹ Starting product.

TABLE 6.—MIXTURES OF SEQUENCED COPOLYMER A OF PROPYLENE AND ETHYLENE WITH POLYETHYLENE E

| | Product A contains (percent E)— | $\eta_{spec}/c$ | $i_{10}$ (190° C.) | Drop test (cm) 0° C. | Drop test (cm) −30° C. | Ball indentation hardness | Transparency (mV) |
|---|---|---|---|---|---|---|---|
| Example No.: | | | | | | | |
| 3a | 1 | 3.2 | 4.6 | >450 | 220 | 524 | 2.5 |
| 3b | 3 | 3.2 | 4.6 | >450 | 270 | 516 | 4.9 |
| 3c | 5 | 3.1 | 4.7 | >450 | 250 | 507 | 7.9 |
| 3d | 7 | 3.1 | 4.7 | >450 | 160 | 500 | 9.1 |
| 3e | 10 | 3.0 | 5.0 | >450 | 160 | 496 | 13.2 |
| 3f | 15 | 2.9 | 4.2 | >450 | 190 | 484 | 8.5 |
| 3g | 20 | 2.9 | 5.0 | >450 | 270 | 496 | 8.0 |
| 3h | 25 | 2.9 | 5.4 | >450 | 250 | 503 | 4.2 |
| 3i | 30 | 2.6 | 7.3 | >450 | 300 | 509 | 1.1 |

¹ Of the mixture.

TABLE 7.—MIXTURES OF SEQUENCED COPOLYMER A OF PROPYLENE AND ETHYLENE WITH POLYETHYLENE F

| | Product A contains (percent F)— | $\eta_{spec}/c$ | $i_{10}$ (190° C.) | Drop test (cm) 0° C. | Drop test (cm) −30° C. | Ball indentation hardness | Transparency (mV) |
|---|---|---|---|---|---|---|---|
| Example No.: | | | | | | | |
| 4a | 1 | 3.2 | 4.6 | >450 | 175 | 516 | 3.1 |
| 4b | 3 | 3.2 | 4.5 | >450 | 225 | 510 | 6.0 |
| 4c | 5 | 3.2 | 4.8 | >450 | 225 | 501 | 6.6 |
| 4d | 7 | 3.0 | 4.7 | >450 | 180 | 497 | 8.8 |
| 4e | 10 | 2.9 | 4.6 | >450 | 125 | 499 | 7.0 |
| 4f | 15 | 2.8 | 3.6 | >450 | 125 | 496 | 9.4 |
| 4g | 20 | 2.9 | 4.3 | >450 | 200 | 499 | 9.0 |
| 4h | 25 | 2.8 | 5.9 | >450 | 175 | 503 | 2.7 |
| 4i | 30 | 2.7 | 8.2 | >450 | 260 | 503 | 0.9 |
| Comparison tests: | | | | | | | |
| a | 50 | 2.3 | 23 | >450 | 400 | 522 | 0.7 |
| b | 70 | 1.8 | 54 | 400 | 180 | 540 | 0.6 |

What is claimed is:

1. A thermoplastic moulding composition consisting of (a) from 70 to 99.5% by weight of a sequenced copolymer of propylene and ethylene of 1 to 30% by weight of ethylene and residual amounts of propylene, having a melt index $i_{10}$ at 190° C. of 0.5 to 60, and (b) from 0.5 to 30% by weight of polyethylene obtained by low-pressure polymerization using Ziegler catalysts having a melt index $i_2$ at 190° C. within the range of from 1 to 30.

2. A thermoplastic moulding composition as claimed in claim 1, wherein the sequenced copolymer of propylene and ethylene contains 3 to 20% by weight of ethylene.

3. A thermoplastic moulding composition as claimed in claim 1, wherein the sequenced copolymer of propylene and ethylene has a melt index $i_{10}$ at 190° C. within the range of from 1 to 30.

4. A thermoplastic moulding composition as claimed in claim 1, which contains 2 to 25% by weight of polyethylene.

References Cited
UNITED STATES PATENTS

| 3,328,486 | 6/1967 | Crawford et al. | 260—876 |
| 3,358,053 | 12/1967 | Hostetler | 260—876 |
| 3,487,128 | 12/1969 | Okazaki et al. | 260—876 |

SAMUEL H. BLECH, Primary Examiner

U.S. Cl. X.R.

260—878, 897 A